(12) United States Patent
Lacaux et al.

(10) Patent No.: US 12,113,401 B2
(45) Date of Patent: Oct. 8, 2024

(54) METHOD AND SYSTEM FOR ACTIVATING AN ELECTRIC MACHINE IN AN AIRCRAFT

(71) Applicant: The Boeing Company, Chicago, IL (US)

(72) Inventors: Frederic Lacaux, Woodinville, WA (US); Kamiar J. Karimi, Kirkland, WA (US); Eugene V. Solodovnik, Kenmore, WA (US); Vyacheslav Khozikov, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 17/674,660

(22) Filed: Feb. 17, 2022

(65) Prior Publication Data

US 2023/0261551 A1  Aug. 17, 2023

(51) Int. Cl.
*H02K 11/20* (2016.01)
*B64D 47/00* (2006.01)

(52) U.S. Cl.
CPC ............. *H02K 11/20* (2016.01); *B64D 47/00* (2013.01)

(58) Field of Classification Search
CPC ................................ H02K 11/20; B64D 47/00
See application file for complete search history.

(56) References Cited

U.S. PATENT DOCUMENTS

| 10,023,138 | B1* | 7/2018 | Lurie | B60R 16/0231 |
| 2002/0153159 | A1* | 10/2002 | Carpenter | B64D 43/00 |
| | | | | 174/117 F |
| 2014/0042831 | A1* | 2/2014 | DiLuciano | B60L 3/08 |
| | | | | 307/328 |
| 2017/0184654 | A1* | 6/2017 | Toyama | G06F 30/18 |
| 2020/0065284 | A1* | 2/2020 | Noll | G06F 11/1629 |

* cited by examiner

*Primary Examiner* — Scott Bauer
(74) *Attorney, Agent, or Firm* — Quinn IP Law

(57) ABSTRACT

A discrete signal interlock system for activating an electric machine in an aircraft includes a first controller, a second controller, and a power source coupled via a single wiring harness bundle to a motor controller that is operatively connected to the electric machine. The motor controller includes a first circuit that is electrically coupled to a driver enabler of the motor controller, and a second circuit that is electrically coupled to a driver of the motor controller. The single wiring harness bundle encloses a first signal cable electrically coupling the first controller to the first circuit, a second signal cable electrically coupling the second controller to the second circuit, a first power cable electrically coupled to the first circuit, and a second power cable electrically coupled to the second circuit. Activation of the motor controller requires activation of the driver in concert with activation of the driver enabler.

20 Claims, 3 Drawing Sheets

METHOD AND SYSTEM FOR ACTIVATING AN ELECTRIC MACHINE IN AN AIRCRAFT

INTRODUCTION

Wiring and interconnect systems for aircraft include power cables for transferring electric power, control cables for transmitting control signals to actuators, and monitoring cables for transmitting signal data from sensors and actuators. The monitoring cables may also be used to interconnect systems, thus enabling them to share data, coordinate sequencing and execute in different orders. The power cables provide electrical power to various systems, some of which may be remotely located. Wire cables may be physically arranged in wiring harness bundles that may group electrical power cables, monitoring cables and control cables in close proximity. Design rules and regulation with physical segregation and separation rules may be used to separate certain wire cables that provide critical information from other cables. For example, flight-by-wire wire cables are fully segregated and run completely independent from other harnesses and wiring.

Cable wires are individually insulated and/or wrapped. However, portions of insulation and wrapping may degrade, and expose a portion of the electrical cable, thus allowing it to come into contact with or arc to a grounding sheath or another cable. Insulation degradation may be due to clamping, material aging, chafing, vibration, exposure to temperature extremes of heat or cold, exposure to moisture, and/or other factors.

When control and/or monitoring cables are combined with power cables within the same wiring harness bundle, there is a risk that a fault in one of the power cables may lead to electrical arcing that may damage other cables in the same wiring harness bundle. This may lead to either an open circuit condition in one or more of the cables, or a short circuit condition between the two or more of the control, monitoring, and power cables. However, it may be difficult to segregate cables for control, monitoring, and electric power transmission in certain regions of an aircraft due to packaging constraints, weight issues, etc.

There is a need for a system, apparatus, and/or method for providing cables for control, monitoring, and electric power transmission in a common bundle in a manner that minimizes risk, including avoiding a fault condition that may lead to an inadvertent movement of a moveable surface of the aircraft. There is a need for high integrity transmission of electric power, control information, and monitoring information that provides immunity from a potential high energy arc that may cause damage in a bundle containing power cables, monitoring cables, and control cables.

SUMMARY

The concepts described herein provide a system, apparatus, and/or method for an aircraft that provides wire cables for electric power transmission, control, and signal transmission in a common wiring harness bundle in a manner that avoids a fault condition that may lead to an inadvertent movement of a moveable surface of the aircraft.

This includes a discrete signal interlock system for activating an electric machine in an aircraft that includes a first controller, a second controller, and a power source coupled via a single wiring harness bundle to a motor controller that is operatively connected to the electric machine. The motor controller includes a first circuit that is electrically coupled to a driver enabler of the motor controller, and a second circuit that is electrically coupled to a driver of the motor controller. The driver enabler and the driver act in concert to operate the motor controller. The single wiring harness bundle encloses a first signal cable electrically coupling the first controller to the first circuit, a second signal cable electrically coupling the second controller to the second circuit, a first power cable electrically coupled to the first circuit, and a second power cable electrically coupled to the second circuit. Activation of the first circuit requires a first signal (A) transmitted from the first controller to the first circuit via the first signal cable, and activation of the second circuit requires a second signal (B) transmitted from the second controller to the second circuit via the second signal cable. Activation of the motor controller requires activation of the driver in concert with activation of the driver enabler, which includes the first signal (A) being a first (fixed) active voltage signal, and the second signal (B) being an encoded pulsewidth modulated signal.

An aspect of the disclosure includes the first signal being a high-impedance active DC signal, and the second signal being a high-impedance active DC signal.

Another aspect of the disclosure includes the first signal (A) being a constant active voltage signal, and the second signal (B) being a pulsewidth modulated signal.

Another aspect of the disclosure includes the pulsewidth modulated signal of the second signal (B) having a duty cycle that is greater than 40%.

Another aspect of the disclosure includes the pulsewidth modulated signal of the second signal (B) including a first duty cycle that commands the motor controller to control the electric machine at a fast motion, and a second duty cycle that commands the motor controller to control the electric machine at a slow motion.

Another aspect of the disclosure includes the first signal (A) being a first pulsewidth modulated signal, and the second signal (B) being a second pulsewidth modulated signal.

Another aspect of the disclosure includes the first pulsewidth modulated signal being out of phase with the second pulsewidth modulated signal.

Another aspect of the disclosure includes the first signal and the second signal being high-impedance active DC signals.

Another aspect of the disclosure includes a fault in the wiring harness bundle disabling activation of the motor controller by deactivating one of the driver or the driver enabler.

Another aspect of the disclosure includes a discrete signal interlock system for controlling an electric machine in an aircraft that includes a first controller and a first power source coupled via a first wiring harness bundle to an input power relay switch that is interposed between an AC power source and a motor controller that is operatively connected to the electric machine, and a second controller and a second power source coupled via a second wiring harness bundle to the motor controller that is operatively connected to the electric machine. The input power relay switch and the driver act in concert to operate the motor controller to control the electric machine. The first wiring harness bundle includes a first signal cable electrically coupling the first controller to the input power relay switch, and a first power cable electrically coupled to the input power relay switch, and the second wiring harness bundle encloses a second signal cable electrically coupling the second controller to the second circuit, and a second power cable electrically coupled to the second circuit. Activation of the first circuit requires a first signal (A) being transmitted from the first controller to the first circuit via the first signal cable, and activation of the second circuit requires a second signal (B) being transmitted from the second controller to the second circuit via the second signal cable. Activation of the motor controller requires activation of the driver and activation of the driver enabler.

Another aspect of the disclosure includes an aircraft that includes a moveable surface operatively controlled by an electric machine, and a discrete signal interlock system arranged to control the electric machine. The discrete signal interlock system includes a first controller, a second controller, and a power source coupled via a single wiring harness bundle to a motor controller that is operatively connected to the electric machine. The motor controller includes a first circuit electrically coupled to a driver enabler of the motor controller and a second circuit electrically coupled to a driver of the motor controller. The driver enabler and the driver act in concert to operate the motor controller to control the electric machine to displace the moveable surface. The single wiring harness bundle encloses a first signal cable electrically coupling the first controller to the first circuit, a second signal cable electrically coupling the second controller to the second circuit, a first power cable electrically coupled to the first circuit, and a second power cable electrically coupled to the second circuit. Activation of the first circuit requires a first signal (A) being transmitted from the first controller to the first circuit via the first signal cable, and activation of the second circuit requires a second signal (B) being transmitted from the second controller to the second circuit via the second signal cable. Activation of the motor controller requires activation of the driver in concert with activation of the driver enabler.

Another aspect of the disclosure includes the moveable surface being one of a flap, an aileron, an elevator, or a stabilizer, wherein occurrence of a fault in the wiring harness bundle deactivates one of the driver or the driver enabler to prevent inadvertent movement of one of the moveable surface.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
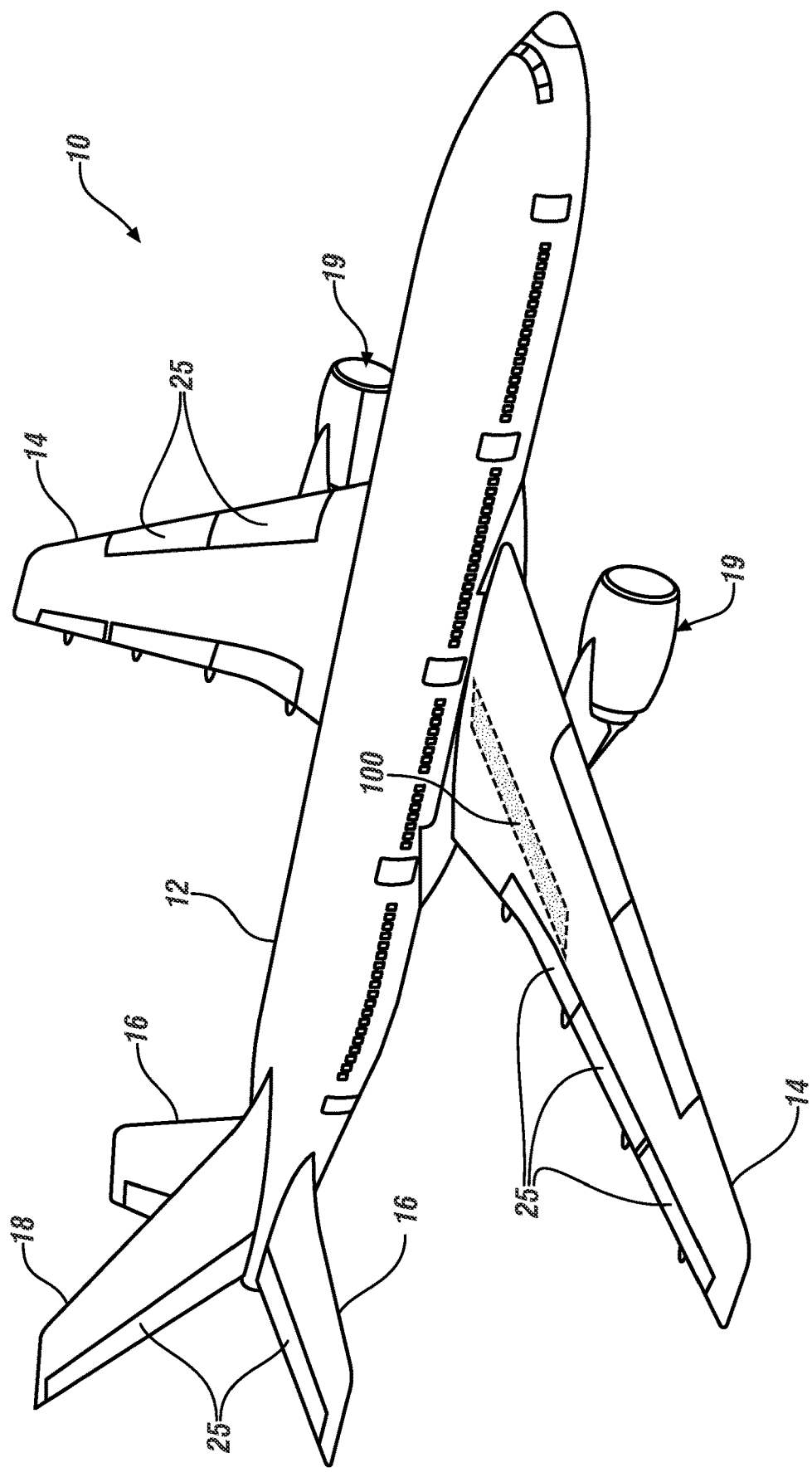
FIG. 1 schematically illustrates an aircraft that includes discrete signal interlock system, in accordance with the disclosure.

FIG. 1 schematically illustrates a fixed wing aircraft 10 that may include and utilize one or more discrete signal interlock systems 100, such as described hereinbelow. Aircraft 10 includes a fuselage 12, one or more wings 14, a horizontal stabilizer 16, and a vertical stabilizer 18. The aircraft 10 also includes one or more turbine engines 19. Each of the one or more wings 14, horizontal stabilizer 16, and vertical stabilizer 18 includes a moveable surface 25 that is arranged on an outside skin of the aircraft 10. The moveable surfaces 25 include, e.g., flaps, ailerons, elevators, stabilizers, etc. The movement or displacement of one or more of the moveable surfaces 25 is controlled via an embodiment of the discrete signal interlock system 100. A single one of the discrete signal interlock systems 100 is illustrated. It is appreciated that each of the moveable surfaces 25 may be operated by an electric machine that is controlled via one of the discrete signal interlock systems 100. Examples of the aircraft 10 include an airplane, a commercial aircraft, and/or a military aircraft. Alternatively, the concepts described herein may be employed as a propulsion device on a flying car, a drone, an electric vertical takeoff and landing vehicle (eVTOL), etc. Alternatively, the concepts described herein may be employed as a propulsion device on a marine system.

Figure 2:
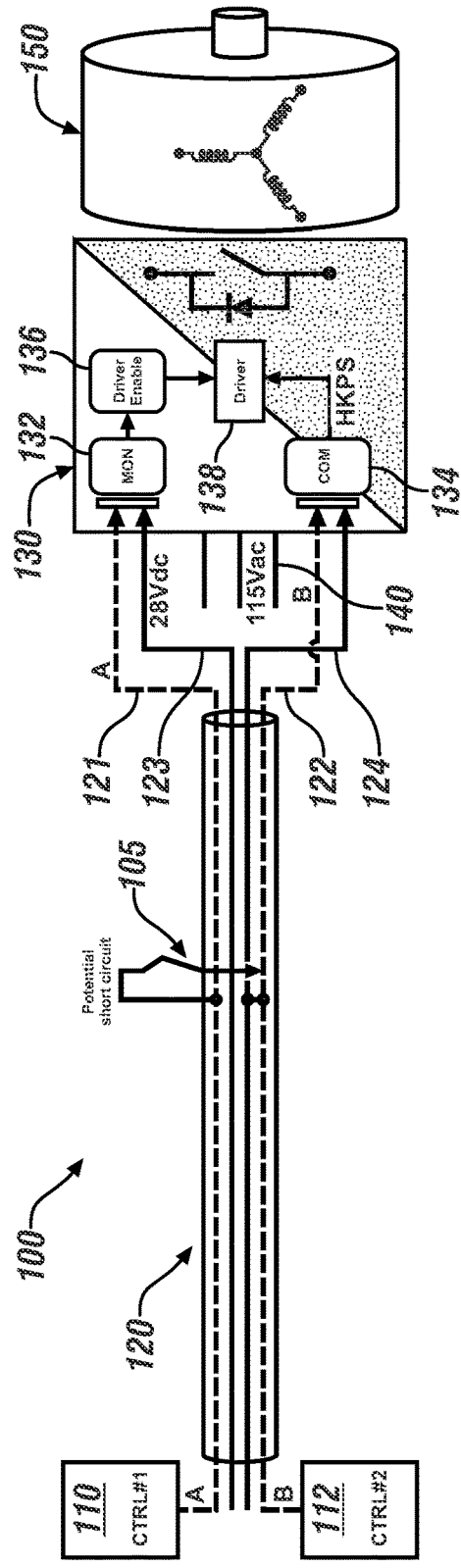
FIG. 2 schematically illustrates details of a discrete signal interlock system for controlling activation of a motor controller, in accordance with the disclosure.

FIG. 2 schematically illustrates details of an embodiment of the discrete signal interlock system 100 that is employed in the control of an electric machine 150 to operate one of the moveable surfaces 25 that is described with reference to FIG. 1. The discrete signal interlock system 100 includes a first controller 110, a second controller 112, a wiring harness bundle 120, and a motor controller 130. In one embodiment, the wiring harness bundle 120 is composed as a single wiring harness bundle. The motor controller 130 is operatively connected to the electric machine 150. In one embodiment, the motor controller 130 comprises an electric power inverter that transforms electric power from an AC power source 140 to a form of electric power that is capable of controlling or actuating the electric machine 150.

Referring again to FIG. 2, the wiring harness bundle 120 encloses a first signal cable 121, a second signal cable 122, a first power cable 123, and a second power cable 124. A potential electrical short circuit 105 is shown for purposes of illustration.

The motor controller 130 includes a first circuit (MON) 132, a second circuit (COM) 134, a driver enabler 136, and a driver 138. The first and second circuits 132, 134 are independent logic circuits that use dedicated connectors and housekeeping power supplies. The first and second circuits 132, 134 are dissimilar circuits that use different technology implementations to prevent common mode faults. The independence of the first and second circuits 132, 134 relies on the A/B wire separation described herein to prevent a common mode fault point.

The first signal cable 121 electrically couples the first controller 110 to the first circuit 132, and the second signal cable 122 electrically couples the second controller 112 to the second circuit 134. The first power cable 123 electrically couples the first circuit 132 to a DC power supply (not shown), and the second power cable 124 electrically couples the second circuit 134 to the DC power supply. The DC power supply may be a 28V DC power supply in one embodiment. The first and second controllers 110, 112 and the DC power supply are remotely located from the electric machine 150. By way of a non-limiting example, the first and second controllers 110, 112 and the DC power supply may be located in the fuselage 12 of the aircraft 10, and the electric machine 150 may be arranged to move or displace one of the moveable surfaces 25 that are described with reference to FIG. 1. The AC power source 140 supplies AC power to the motor controller 130.

The driver enabler 136 and the driver 138 act in concert to operate the motor controller 130 to control the electric machine 150 to move, displace, or otherwise change position of the moveable surface 25. The electric machine 150 employs AC power from the AC power source 140.

The driver enabler 136 is activated by the first circuit 132 in cooperation with the DC power supply, and requires that a first signal (A) be transmitted from the first controller 110 to the first circuit 132 via the first signal cable 121. The driver 138 is activated by the second circuit 134 in cooperation with the DC power source, and requires that a second signal (B) be transmitted from the second controller 112 to the second circuit 134 via the second signal cable 122.

Figure 3:
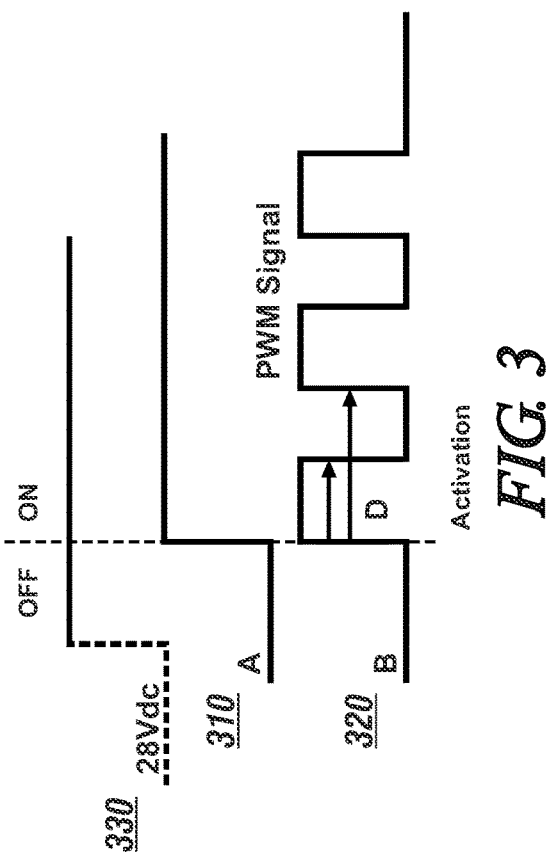
FIG. 3 schematically illustrates a first set of control signals for controlling a discrete signal interlock system to control operation of a motor controller, in accordance with the disclosure.

Referring now to FIG. 3, with continued reference to the discrete signal interlock system 100 of FIG. 2, a first set of control signals for controlling the discrete signal interlock system 100 to control operation of the motor controller 130 are schematically illustrated in relation to time, and include first signal (A) 310, second signal (B) 320, and the DC power source signal 330. In this embodiment, a high impedance active 28 Vdc signal is used for both the first signal (A) 310 and the second signal (B) 320 to avoid an un-commanded operation of the motor controller 130, and thus avoid inadvertent actuation of the electric machine 150 in the event of a wiring fault such as a short circuit. In one embodiment, the high impedance active 28 Vdc signal is an impedance level that is sufficient to avoid inadvertent actuation of the electric machine 150 in the event of a wiring fault. The first signal (A) 310 employs a pulsewidth-modulation (PWM) concept to send the information to operate the motor controller 130. The PWM signal has a pre-determined pattern of cycling between 0 Vdc and 28 Vdc with a defined period and duty cycle. The PWM signal may carry multiple messages using the following patterns. To encode a required state load of OFF, both the first signal (A) 310 and the second signal (B) 320 are commanded to 0 V. When the requested state is to activate the motor controller 130, the first signal (A) 310, may be set to a fixed active voltage signal, and the second signal (B) 320 may be set to an encoded PWM signal with a predefined duty cycle. In one embodiment, the PWM duty cycle is set to be greater than 40%. The PWM duty cycle may be further used to communicate different operating modes, e.g., a first duty cycle and a second duty cycle. The PWM duty cycle may communicate the first duty cycle to command a relatively fast motion of the electric machine 150, which in turn moves a respective one of the moveable surfaces 25 of the aircraft 10 at a relatively fast rate of speed. The PWM duty cycle may communicate the second duty cycle to command a relatively slow motion of the electric machine 150, which in turn moves a respective one of the moveable surfaces 25 of the aircraft 10 at a relatively slow rate of speed. Furthermore, in the event of a fault in the wiring harness bundle 120, there is no risk of inadvertent activation of the motor controller 130 to operate the electric machine 150, or inadvertent movement of one of the moveable surfaces 25 of the aircraft 10.

Figure 4:
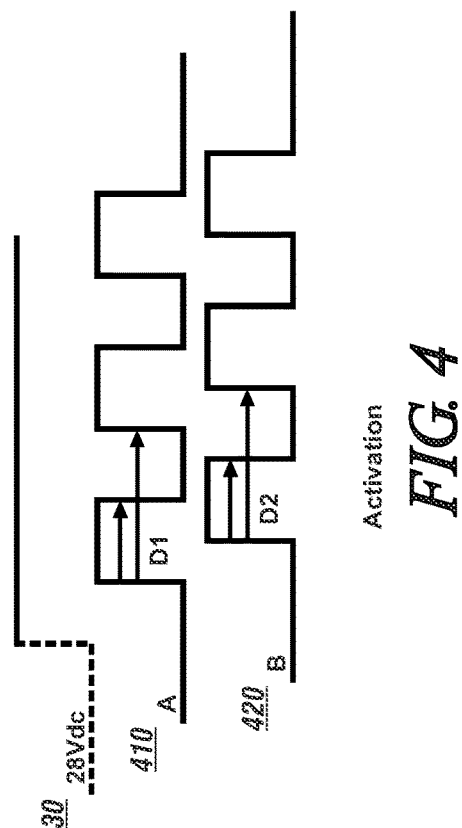
FIG. 4 schematically illustrates a second set of control signals for controlling a discrete signal interlock system to control operation of a motor controller, in accordance with the disclosure.

Referring now to FIG. 4, with continued reference to the discrete signal interlock system 100 of FIG. 2, a second set of control signals for controlling the discrete signal interlock system 100 to control operation of the motor controller 130 are schematically illustrated in relation to time, and include first signal (A) 410, second signal (B) 420, and the DC power source signal 430. In this embodiment, a high impedance active 28 Vdc signal is used for both the first signal (A) 410 and the second signal (B) 420 to avoid an un-commanded operation of the motor controller 130 to activate the electric machine 150 in the event of a wiring fault such as a short circuit. In this embodiment, both the first signal (A) 410 and the second signal (B) 420 employ pulsewidth-modulation to send the information of load activation to the motor controller 130. The PWM signals each have a pre-determined pattern of cycling between 0 Vdc and 28 Vdc with a defined period and duty cycle. The PWM signal may carry multiple messages using the following patterns. To encode a required state load of OFF, both the first signal (A) 410 and the second signal (B) 420 at commanded to 0 V. When the requested state is to activate the motor controller 130, the first signal (A) 410, may be set to a first encoded PWM signal with a predefined duty cycle, and the second signal (B) 420 may be set to a second encoded PWM signal with a predefined duty cycle. In one embodiment, the first PWM duty cycle is set to be greater than 40%, and the second PWM duty cycle is set to be greater than 40%, with the phase timings of the first and second PWM signals being offset by a period of time. The first and second PWM duty cycles may be further used to communicate different operating modes, e.g., a first duty cycle commanding a fast motion of the electric machine 150, and a second duty cycle commanding a slow motion of the electric machine 150.

This form of PWM encoding may be employed to provide additional integrity to the signal transmission, including carrying information such as a control mode for the operation of the motor controller 130 and electric machine 150. Furthermore, in the event of a fault in the wiring harness bundle 120, there is no risk of inadvertent activation of the motor controller 130 and electric machine 150, and thus no risk of inadvertent movement or displacement of one of the moveable surfaces 25 of the aircraft 10.

Figure 5:
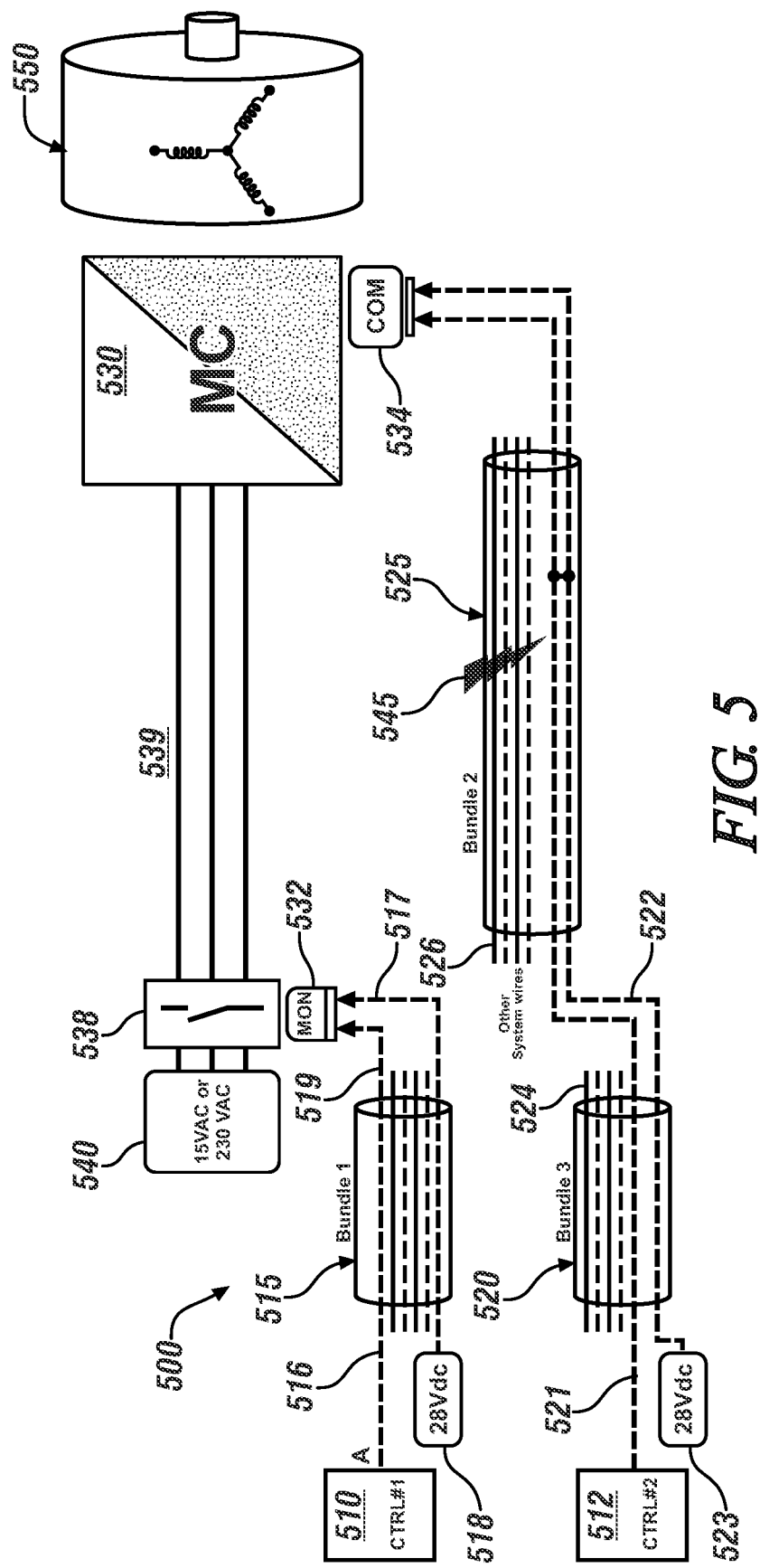
FIG. 5 schematically illustrates details of an embodiment of a discrete signal interlock system for controlling activation of a motor controller, in accordance with the disclosure.

FIG. 5 schematically illustrates details of another embodiment of the discrete signal interlock system 500 to provide high integrity for critical load activation. The discrete signal interlock system 500 includes a first controller 510, a second control 512, a first wiring harness bundle 515, a second wiring harness bundle 520, a third wiring harness bundle 525, a motor controller 130, and an input power relay switch 538. The motor controller 530 is operatively connected to an electric machine 550, which may serve as an actuator to operatively control one of the moveable surfaces 25 that are described with reference to FIG. 1.

Referring again to FIG. 5, the discrete signal interlock system 500 includes the first wiring harness bundle 515, which encloses a first signal cable 516, a first power cable 517 electrically connected to a first DC power supply 518, and a first plurality of other cables, illustrated collectively as element 519. The second wiring harness bundle 520 encloses a second signal cable 521, a second power cable 522 electrically connected to a second DC power source 523, and a second plurality of other cables, illustrated collectively as element 524. The third wiring harness bundle 525 encloses the second signal cable 521, the second power cable 522 electrically connected to a second DC power source 523, and a third plurality of other cables, illustrated collectively as element 526.

In this embodiment, the first controller 510 and the first DC power source 518 connect to a first circuit (MON) 532 of the input power relay switch 538 via the first wiring harness bundle 515. The input power relay switch 538 controllably connects an AC power source 536 to the motor controller 530 via a multi-cable wiring harness 539. In this embodiment the AC power source 536 is at a location that is remote from the motor controller 530. The first circuit (MON) 532 is connected to the input power relay switch 538 to control activation and deactivation thereof.

The second controller 512 and the second DC power source 523 connect to the second circuit (COM) 534 of the motor controller 530 via the second wiring harness bundle 520 and the third wiring harness bundle 525. Again, the first and second circuits 532, 534 are independent logic circuits that use dedicated connectors and housekeeping power supplies. The first and second circuits 532, 534 are dissimilar circuits that use different technology implementations to prevent common mode faults. The independence of the first and second circuits 532, 534 relies on the A/B wire separation described herein to prevent a common mode fault point in the control chain.

The first signal cable 516 electrically couples the first controller 510 to the first circuit 532, and the second signal cable 521 electrically couples the second controller 512 to the second circuit 534. The first power cable 517 electrically couples the first circuit 532 to the first DC power supply 518, and the second power cable 521 electrically couples the second circuit 534 to the second DC power supply 522. The DC power supply may be a 28V DC power supply in one embodiment. The first and second controllers 510, 512 and the first and second DC power sources 518, 522 are remotely located from the electric machine 550.

The first circuit 532 activates the input power relay switch 538 in response to a first control signal (A) from the first controller 510 via the first signal cable 516, and the second circuit 534 activates the motor controller 530 in response to a second control signal (B) from the second controller 512 via the second signal cable 521, and the motor control 130 employs AC power from the AC power source 540 to activate the electric machine 150.

In this embodiment, the input power relay switch 538 is employed to interlock the load activation at the motor controller 530. The first signal (A) is used to control the input power relay switch 538, which controls 115 Vac or 230 Vac power to the load.

When the first signal (A) is OFF, the input power relay switch 538 is OFF and the load cannot be activated even when there is a fault either the second wiring harness bundle 520 or the third wiring harness bundle 525 (illustrated as 545). When the first signal (A) is ON, the input power relay switch 538 is ON, the motor controller 530 is capable to be activated when the second signal (B) signal is ON. Load will stay on standby if B signal is OFF. However, because the input power relay switch 538 is not located in the same area as the motor controller 530, the first and second signals (A) and (B), the first circuit 532 and the second circuit 534 are naturally segregated. Use of a PWM concept as described with reference to FIGS. 3 and 4 to control the first and second signals (A) and (B) provides an additional layer of protection for multiple failure conditions or can also encode more information for the motor controller 530, such as a controls mode. The input power relay switch 538 may be a selected from existing aircraft power relays to implement additional controls functions without additional hardware. The load can be simplified to only include the second circuit 534, which is simpler than a PWM control case because it does not need to read PWM duty cycles.

The use of ordinals such as first, second and third does not necessarily imply a ranked sense of order, but rather may only distinguish between multiple instances of an act or structure.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A discrete signal interlock system for controlling an electric machine in an aircraft, comprising:
    a first controller, a second controller, a power source, a single wiring harness bundle, and a motor controller, wherein the power source is coupled via the single wiring harness bundle to the motor controller that is operatively connected to the electric machine;
    wherein the motor controller includes a first circuit electrically coupled to a driver enabler of the motor controller and a second circuit electrically coupled to a driver of the motor controller;
    wherein the driver enabler and the driver act in concert to operate the motor controller to control the electric machine;
    wherein the single wiring harness bundle encloses a first signal cable electrically coupling the first controller to the first circuit, a second signal cable electrically coupling the second controller to the second circuit, a first power cable electrically coupled to the first circuit, and a second power cable electrically coupled to the second circuit;
    wherein activation of the first circuit requires a first signal being transmitted from the first controller to the first circuit via the first signal cable;
    wherein activation of the second circuit requires a second signal being transmitted from the second controller to the second circuit via the second signal cable; and
    wherein activation of the motor controller requires activation of the driver in concert with activation of the driver enabler.

2. The discrete signal interlock system of claim 1, wherein the first signal comprises a constant active voltage signal; and wherein the second signal comprises a pulsewidth modulated signal.

3. The discrete signal interlock system of claim 2, the pulsewidth modulated signal of the second signal has a duty cycle that is greater than 40%.

4. The discrete signal interlock system of claim 2, wherein the pulsewidth modulated signal of the second signal includes a first duty cycle that commands the motor controller to control the electric machine at a fast motion, and a second duty cycle that commands the motor controller to control the electric machine at a slow motion.

5. The discrete signal interlock system of claim 1, wherein the first signal comprises a first pulsewidth modulated signal; and wherein the second signal comprises a second pulsewidth modulated signal.

6. The discrete signal interlock system of claim 5, wherein the first pulsewidth modulated signal is out of phase with the second pulsewidth modulated signal.

7. The discrete signal interlock system of claim 1, wherein the first signal and the second signal comprise high-impedance active DC signals.

8. The discrete signal interlock system of claim 1, wherein a fault in the wiring harness bundle disables activation of the motor controller by deactivating one of the driver or the driver enabler.

9. A discrete signal interlock system for controlling an electric machine in an aircraft, comprising:
    a first controller and a first power source coupled via a first wiring harness bundle to an input power relay switch that is interposed between an AC power source and a motor controller that is operatively connected to the electric machine; and
    a second controller and a second power source coupled via a second wiring harness bundle to a second circuit operatively connected to the motor controller that is operatively connected to the electric machine;
    wherein the input power relay switch and the second circuit act in concert to operate the motor controller to control the electric machine;
    wherein the first wiring harness bundle includes a first signal cable electrically coupling the first controller to the input power relay switch, and a first power cable electrically coupled to the input power relay switch;
    wherein the second wiring harness bundle encloses a second signal cable electrically coupling the second controller to the second circuit, and a second power cable electrically coupled to the second circuit;
    wherein activation of the input power relay switch requires a first signal being transmitted from the first controller to the input power relay switch via the first signal cable;
    wherein activation of the second circuit requires a second signal being transmitted from the second controller to the second circuit via the second signal cable; and
    wherein activation of the motor controller requires activation of the input power relay switch and activation of the second circuit.

10. The discrete signal interlock system of claim 9, wherein the first signal comprises a constant active voltage signal; and wherein the second signal comprises a pulsewidth modulated signal.

11. The discrete signal interlock system of claim 10, wherein the pulsewidth modulated signal of the second signal has a duty cycle that is greater than 40%.

12. The discrete signal interlock system of claim 10, wherein the pulsewidth modulated signal of the second signal includes a first duty cycle that commands the motor controller to control the electric machine at a fast motion, and a second duty cycle that commands the motor controller to control the electric machine at a slow motion.

13. The discrete signal interlock system of claim 9, wherein the first signal comprises a first pulsewidth modulated signal; and wherein the second signal comprises a second pulsewidth modulated signal.

14. The discrete signal interlock system of claim 13, wherein the first pulsewidth modulated signal is out of phase with the second pulsewidth modulated signal.

15. The discrete signal interlock system of claim 9, wherein a fault in the wiring harness bundle deactivates one of the input power relay switch or the second circuit to disable activation of the motor controller.

16. An aircraft, comprising, comprising:
a moveable surface operatively controlled by an electric machine; and
a discrete signal interlock system arranged to control the electric machine;
wherein the discrete signal interlock system includes:
a first controller, a second controller, and a power source coupled via a single wiring harness bundle to a motor controller that is operatively connected to the electric machine;
wherein the motor controller includes a first circuit electrically coupled to a driver enabler of the motor controller and a second circuit electrically coupled to a driver of the motor controller;
wherein the driver enabler and the driver act in concert to operate the motor controller to control the electric machine to move the moveable surface;
wherein the single wiring harness bundle encloses a first signal cable electrically coupling the first controller to the first circuit, a second signal cable electrically coupling the second controller to the second circuit, a first power cable electrically coupled to the first circuit, and a second power cable electrically coupled to the second circuit;
wherein activation of the first circuit requires a first signal being transmitted from the first controller to the first circuit via the first signal cable;
wherein activation of the second circuit requires a second signal being transmitted from the second controller to the second circuit via the second signal cable; and
wherein activation of the motor controller requires activation of the driver in concert with activation of the driver enabler.

17. The aircraft of claim 16, wherein the first signal comprises a constant active voltage signal; and wherein the second signal comprises a pulsewidth modulated signal.

18. The aircraft of claim 16, wherein the first signal comprises a first pulsewidth modulated signal; and wherein the second signal comprises a second pulsewidth modulated signal.

19. The aircraft of claim 18, wherein the second pulsewidth modulated signal of the second signal includes a first duty cycle that commands the motor controller to control the electric machine to move the moveable surface at a fast motion, and a second duty cycle that commands the motor controller to control the electric machine to move the moveable surface at a slow motion.

20. The aircraft of claim 16, wherein the moveable surface comprises one of a flap, an aileron, an elevator, or a stabilizer, and wherein occurrence of a fault in the wiring harness bundle deactivates one of the driver or the driver enabler to prevent inadvertent movement of the moveable surface.

* * * * *